US006852967B2

(12) United States Patent
Engelhardt et al.

(10) Patent No.: US 6,852,967 B2
(45) Date of Patent: Feb. 8, 2005

(54) SCANNING MICROSCOPE AND METHODS FOR WAVELENGTH-DEPENDENT DETECTION

(75) Inventors: Johann Engelhardt, Bad Schoenborn (DE); Werner Knebel, Kronau (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 315 days.

(21) Appl. No.: 10/188,622

(22) Filed: Jul. 3, 2002

(65) Prior Publication Data

US 2003/0006368 A1 Jan. 9, 2003

(30) Foreign Application Priority Data

Jul. 5, 2001 (DE) ......................................... 101 32 638

(51) Int. Cl.[7] ................................................. G01G 3/50
(52) U.S. Cl. ..................... 250/226; 250/216; 250/201.3
(58) Field of Search ................................. 250/226, 216, 250/201.3, 306, 307, 559.4, 234, 235, 237 G

(56) References Cited

U.S. PATENT DOCUMENTS

| 4,745,273 A | 5/1988 | Szabo et al. ................ 250/207 |
| 5,329,352 A | 7/1994 | Jacobsen .................... 356/301 |
| 5,945,669 A | 8/1999 | Arai ........................... 250/234 |
| 6,300,639 B1 | 10/2001 | Wiederhoeft ............. 250/458.1 |
| 6,555,820 B1 * | 4/2003 | Tacke et al. ........... 250/339.01 |

FOREIGN PATENT DOCUMENTS

| DE | 4330347 | 3/1995 |
| DE | 19902625 | 9/1999 |
| DE | 19829944 | 1/2000 |
| WO | 9507447 | 3/1995 |

OTHER PUBLICATIONS

H.J. Tiziani et al.: "Three–dimensional image sensing by chromatic confocal microscopy" in Applied Optics; Apr. 1, 1994; pp. 1838–1843.

* cited by examiner

Primary Examiner—Que T. Le
(74) Attorney, Agent, or Firm—Davidson, Davidson & Kappel, LLC

(57) ABSTRACT

A scanning microscope for examination of a sample (31), having at least one optical component (89) that exhibits a wavelength-dependent characteristic and having an apparatus for wavelength-dependent detection that acquires measured values in at least two wavelength regions each characterized by a spectral width and a spectral position, is disclosed. The scanning microscope is characterized in that the wavelength-dependent characteristic of the at least one optical component (89) can be ascertained, can be at least temporarily stored in the form of a data set in a memory (49, 81), and can be considered upon acquisition and/or upon utilization of the measured values.

23 Claims, 2 Drawing Sheets

SCANNING MICROSCOPE AND METHODS FOR WAVELENGTH-DEPENDENT DETECTION

CROSS REFERENCE TO RELATED APPLICATIONS

This application claims priority of the German patent application 101 32 638.6 which is incorporated by reference herein.

FIELD OF THE INVENTION

The invention concerns a scanning microscope for examination of a sample, having at least one optical component that exhibits a wavelength-dependent characteristic and having an apparatus for wavelength-dependent detection that acquires measured values in at least two wavelength regions each characterized by a spectral width and a spectral position.

The invention also concerns methods for wavelength-dependent detection with a scanning microscope.

BACKGROUND OF THE INVENTION

In scanning microscopy, a sample is illuminated with a light beam in order to observe the detected light, constituting reflected or fluorescent light, emitted by the sample. The focus of an illuminating light beam is moved in a sample plane by means of a controllable beam deflection device, generally by tilting two mirrors; the deflection axes are usually perpendicular to one another, so that one mirror deflects in the X direction and the other in the Y direction. Tilting of the mirrors is brought about, for example, by means of galvanometer positioning elements. The power level of the detected light coming from the specimen is measured as a function of the position of the scanning beam, and the detected values thus ascertained are allocated to position values. In order to ascertain the position values, the positioning elements are usually equipped with sensors that ascertain the present mirror position.

In confocal scanning microscopy specifically, a specimen is scanned in three dimensions with the focus of a light beam.

A confocal scanning microscope generally comprises a light source, a focusing optical system with which the light of the source is focused onto an diaphragm (called the "excitation diaphragm), a beam splitter, a beam deflection device for beam control, a microscope optical system, a detection diaphragm, and the detectors for detecting the detected or fluorescent light. The illuminating light is coupled in via a beam splitter. The fluorescent or reflected light coming from the specimen travels by way of the beam deflection device back to the beam splitter, passes through it, and is then focused onto the detection diaphragm behind which the detectors are located. This detection arrangement is called a "descan" arrangement. Detected light that does not derive directly from the focus region takes a different light path and does not pass through the detection diaphragm, so that a point datum is obtained which results, by sequential scanning of the specimen, in a three-dimensional image. A three-dimensional image is usually achieved by acquiring image data in layers.

German Patent Application DE 198 29 944 A1 discloses a method for device configuration, preferably of laser scanning microscopes, in which laser light having one or more spectral lines is generated and is directed onto a sample which contains a fluorescent dye or onto which a fluorescent dye is applied. The excitation wavelengths and emission wavelengths of different fluorescent dyes are acquired in separate data sets and are stored in a data memory. The laser spectra that can be set with the microscope and are to be directed onto the sample, and the transmission spectra achievable with the available filters, are also acquired in data sets and those data sets are saved. Parameters for configuration of the microscope are ascertained from a computational combination of said data sets. The device configuration concerns the selection of the laser line of the excitation laser, and the selection of suitable filters.

German Patent Application DE 43 30 347 A1 discloses an apparatus for the selection and detection of at least two spectral regions of a light beam, having a selection device and a detection device. For reliable simultaneous selection and detection of different spectral regions at high yield and with the simplest possible design, the apparatus is configured in such a way that the selection device comprises means for spectral dispersion of the light beam and means on the one hand for blocking out a first spectral region and on the other hand for reflecting at least a portion of the unblocked spectral region, and the detection device comprises a first detector arranged in the beam path of the blocked-out first spectral region and a second detector arranged in the beam path of the reflected spectral region. A slit diaphragm arrangement having mirror-coated diaphragm panels is provided as the means for blocking out a first spectral region and on the other hand for reflecting at least a portion of the unblocked spectral region. The apparatus is usable in particular as a multi-band detector in a scanning microscope.

The known scanning microscopes and known methods have the disadvantage that a largely accurate quantitative spectral analysis of the light proceeding from a sample is not possible.

SUMMARY OF THE INVENTION

It is therefore the object of the invention to propose a scanning microscope that makes possible a quantitative spectral examination of the light emitted from a sample in at least two wavelength regions.

The above object is achieved by a scanning microscope for examination of a sample comprising:
  at least one optical component that exhibits a wavelength-dependent characteristic,
  apparatus for wavelength-dependent detection that acquires measured values in at least two wavelength regions each characterized by a spectral width and a spectral position, wherein the wavelength-dependent characteristic of the at least one optical component can be ascertained, can be at least temporarily stored in the form of a data set in a memory, and can be considered upon acquisition and/or upon utilization of the measured values.

A further object of the invention is to describe a method that makes possible a quantitative spectral examination of the light emitted from a sample.

This object is achieved by a method that contains the following steps:
  ascertaining at least one wavelength-dependent characteristic of at least one optical component of the scanning microscope;
  storing the ascertained wavelength-dependent characteristic of the optical component of the scanning microscope in the form of a data set in a memory;
  acquiring measured values and utilizing the measured values, with consideration of the wavelength-dependent characteristic of the optical component of the scanning microscope upon acquisition and/or upon utilization.

What has been recognized according to the present invention is that selection of the wavelength of the exciting light and/or the color filter is not exclusively what influences the measured values obtained from the light proceeding from the sample.

In a preferred embodiment, an apparatus that contains a selective element which is embodied as a prism, grating, hologram, filter, or dichroic filter is used for wavelength-dependent detection of the light proceeding from the sample. Prisms, in particular, exhibit a nonlinear wavelength-dependent characteristic. Within a spectrum produced by spatial division with a prism, spectral segments of differing width belong to spatial segments of equal width. In the preferred embodiment, provision is therefore made for ascertaining this nonlinear correlation in a measurement series and storing it as a data set, so that these data can be considered either when measured values are acquired or when the measured values are utilized, in the form of a correction or an offset with the detected or position values.

In a further embodiment that contains a multi-band detector having a slit diaphragm arrangement, consideration upon acquisition of the measured values is implemented by way of a modification in the slit gap as a function of spectral position. The width of the slit gap is preferably controlled in such a way that the spectral width of the wavelength regions is independent of the spectral position of the wavelength regions.

In another embodiment, a multi-channel detector is provided that is embodied, for example, as a CCD array, as an array of photodiodes, or as a multi-channel photomultiplier, onto which the spatially spectrally spread light is focused. In this embodiment, the individual detectors of the multi-channel detector are allocated to different spectral wavelength regions. In this embodiment, consideration of the wavelength-dependent characteristic is realized by way of a variable allocation of, in particular, the number of individual detectors to a wavelength region as a function of the spectral position of the wavelength region. The spectral width of the wavelength regions is preferably independent of the spectral position of the wavelength regions, which can be achieved for example by proper calibration and/or correction of the measured values.

In a further variant embodiment, the apparatus for wavelength-dependent detection contains at least one detector, the wavelength-dependent characteristic in this case being a property of the detector. In particular, the spectral sensitivity of photomultipliers is highly wavelength-dependent. Here consideration is accomplished, according to the present invention, by controlling the voltage applied to the photomultiplier as a function of the spectral position of the wavelength regions on the basis of the ascertained data set.

In another variant embodiment, the scanning microscope contains a detection diaphragm whose opening width is adjustable. In this case the wavelength-dependent characteristic is a property of the detection diaphragm. An embodiment in which the opening width of the detection diaphragm is modified as a function of the spectral position of the wavelength regions is particularly advantageous. This effectively takes into account, in particular, the different focus diameters of detected light of different wavelength regions. This embodiment is advantageous in particular in the context of confocal scanning microscopes.

With the embodiments described, all the wavelength-dependent characteristics of the components of a scanning microscope can be considered. A wavelength-dependent characteristic is usually also a property of a beam splitter.

In a particular embodiment, the utilization of the measured values encompasses the generation of image data; this contains a correction of the measured values on the basis of the ascertained wavelength-dependent characteristic. A calculation unit, which is configured e.g. as a PC, is preferably provided for this purpose. The calculation unit preferably encompasses a memory in which the wavelength-dependent characteristic is stored in the form of a data set. If the wavelength-dependent characteristic concerns, for example, the spectral sensitivity of the detector, the algorithm for utilization of the measured values then contains an arithmetic division of the measured values of a wavelength region by the spectral sensitivity in that region.

In a particularly preferred embodiment, provision is made for a calibration of the apparatus for wavelength-dependent detection on the basis of the ascertained wavelength-dependent characteristic.

BRIEF DESCRIPTION OF THE DRAWINGS

The subject matter of the invention is depicted schematically in the drawings and will be described below with reference to the Figures, identically functioning elements being labeled with identical reference characters. In the drawings.

DETAILED DESCRIPTION OF THE INVENTION

Figure 1:
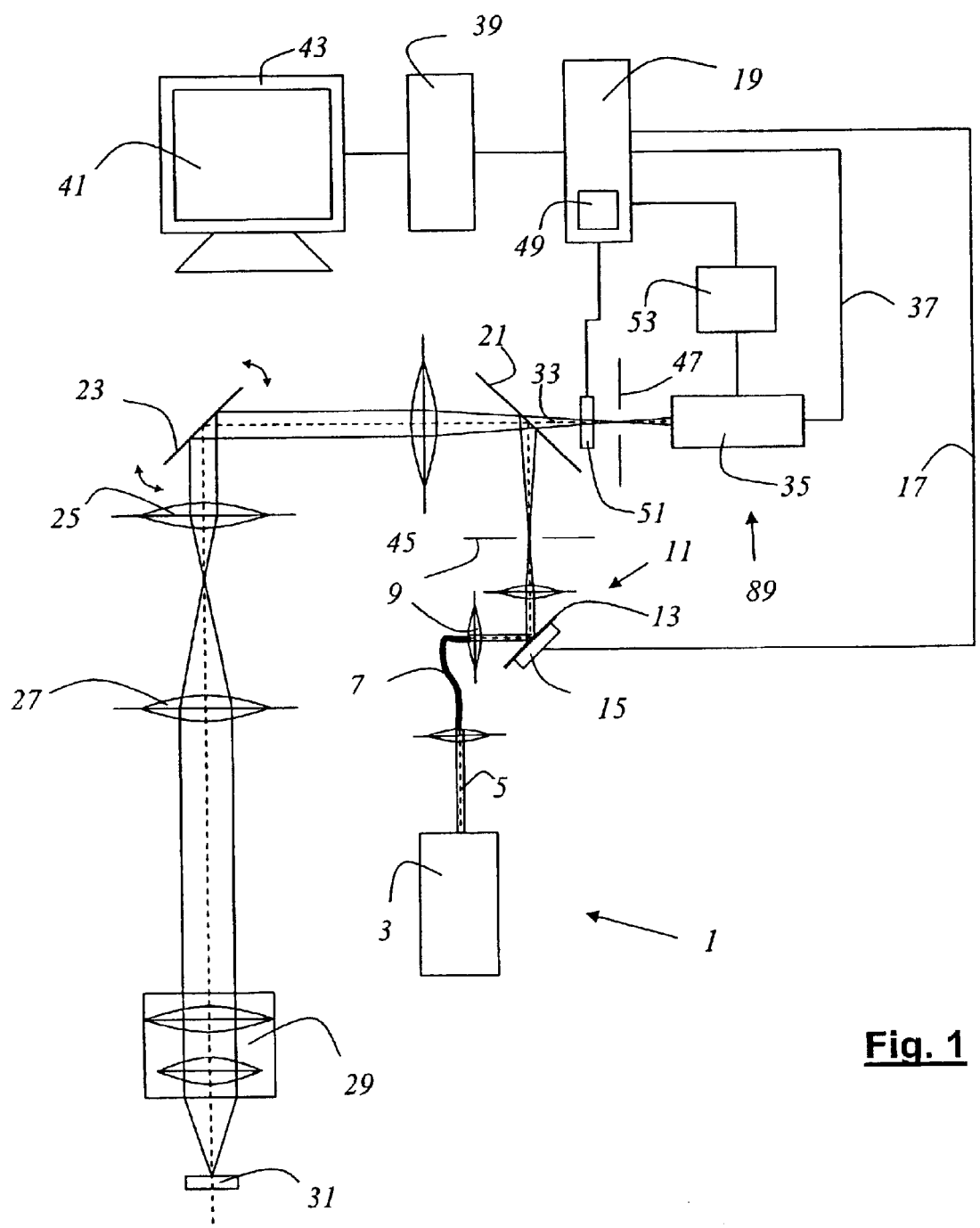
FIG. 1 shows a scanning microscope according to the present invention.

FIG. 1 schematically shows a scanning microscope according to the present invention that is embodied as a confocal scanning microscope. Illuminating light beam 5 coming from an illumination system 1, which is embodied as a laser 3, is transported via a glass fiber 7 and, after being coupled out of glass fiber 7 by way of optical system 9, strikes an apparatus 11 for ascertaining power level which, with a beam splitter 13, splits a measurement beam out of illuminating light beam 5 and conveys it to detector 15. Detector 15 generates an electrical signal that is proportional to the power level of illuminating light beam 5 and is directed via line 17 to processing unit 19. Illuminating light beam 5 arrives via a beam splitter 21 at gimbal-mounted scanning mirror 23, which guides illuminating light beam 5 via scanning optical system 25, tube optical system 27, and objective 29 over or through sample 31. In the case of non-transparent samples 31, illuminating light beam 5 is guided over the sample surface. In the case of biological samples 31 (preparations) or transparent samples, illuminating light beam 5 can also be guided through sample 31. This means that different focal planes of the specimen are successively scanned by illuminating light beam 5. Subsequent assembly then yields a three-dimensional image of the sample. Detected light 33 proceeding from the sample travels through objective 29, tube optical system 27, and scanning optical system 25 and via scanning mirror 23 to beam splitter 21, passes through the latter, and after passing through a filter wheel 51 strikes a detector apparatus 35 that is configured as a photomultiplier. In detector apparatus 35, electrical detection signals proportional to the power level of the detected light are generated and are forwarded via line 37 to processing unit 19. Utilization of the measured values is performed in processing unit 19. This includes, inter alia, the allocation of position signals to the respective measured values. The position signals are ascertained, for example, from the position of the gimbal-mounted scanning mirror 23 for each grid point. In the processing unit, image data are generated from the measured values and are processed with a PC 39 into an image 41 that is displayed on monitor 43. Illumination diaphragm 45 and detection diaphragm 47, which are usually provided in a confocal scanning microscope, are drawn in schematically for the sake of completeness. Certain optical elements for guiding and shaping the light beams are, however, omitted for better clarity; these are sufficiently known to one skilled in this art. Processing unit 19 comprises a memory 49 in which the wavelength-dependent characteristic of optical component 89, i.e. of detector apparatus 35, is stored. Detector apparatus 35, configured as a photomultiplier, has different sensitivities for detected light of different wavelengths. Filter wheel 51 arranged in front of detector apparatus 35 contains multiple bandpass filters (not shown) which can be introduced successively into the detection beam path. The bandpass filters allow light of different wavelength regions of detected light 33 to pass through to detector apparatus 35. The setting of filter wheel 51 is transmitted to processing unit 19 which, on that basis and in consideration of the data set stored in memory 49, controls power supply 53 which makes available the high voltage for the photomultiplier and thus controls the voltage applied to the photomultiplier. When the bandpass filter located in the beam path is one that allows passage of detected light to which detector apparatus 35 is less sensitive, the voltage at the photomultiplier is increased. In the opposite case, i.e. greater sensitivity, a reduction in the voltage is performed.

Figure 2:
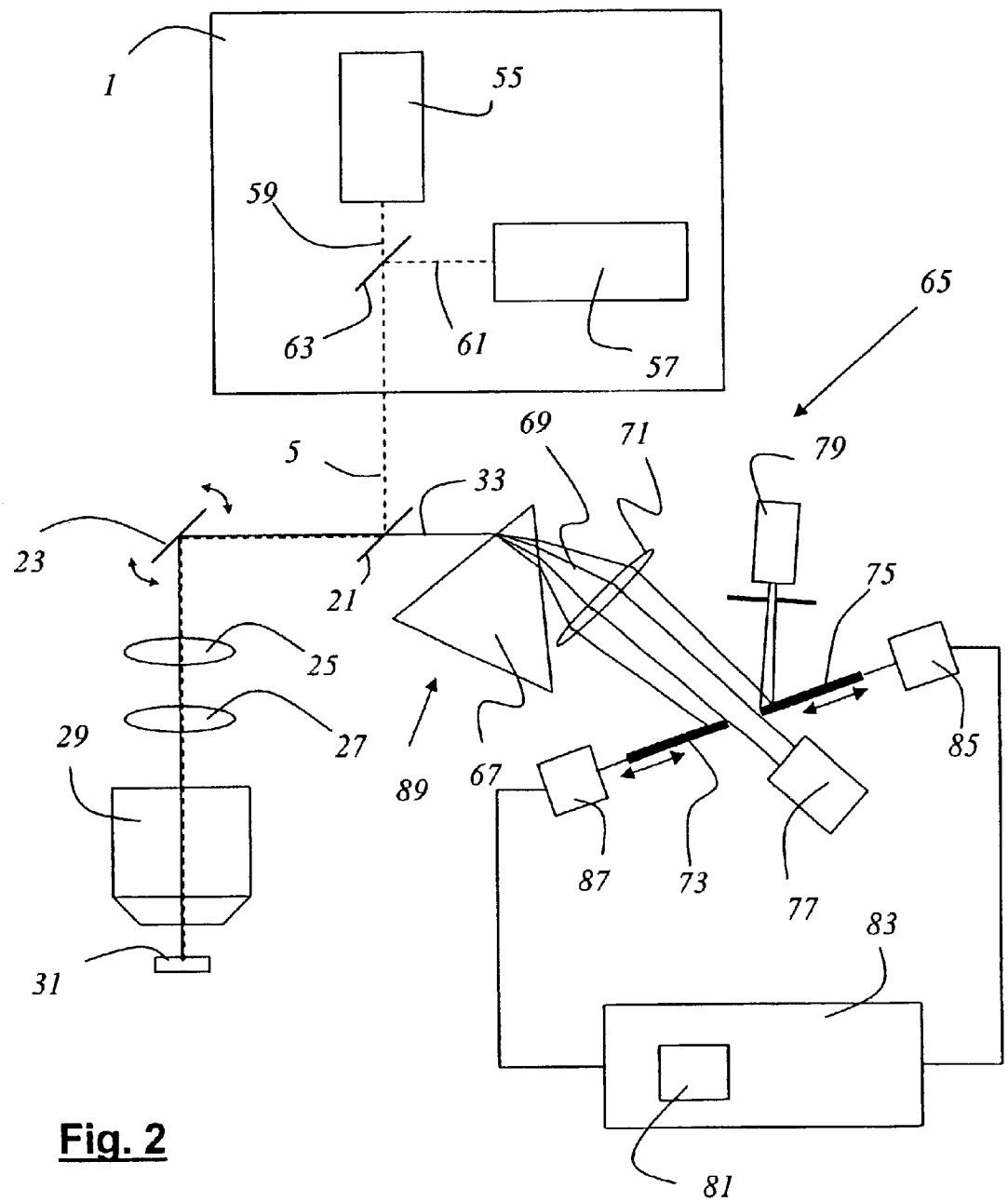
FIG. 2 shows a further scanning microscope according to the present invention.

FIG. 2 shows a scanning microscope according to the present invention whose illumination system 1 contains two lasers 55, 57 that emit a first light beam 59 and second light beam 61. First light beam 59 and second light beam 61 are combined, with a dichroic beam combiner 63, into one illuminating light beam 5. A multi-band detector 65 is provided for detection. Detected light 33 is spatially spectrally divided with an optical component 89 that is configured as prism 67. A further possibility for spectral division is the use of a reflection grating or transmission grating, or a holographic grating. The spectrally divided light fan 69 is focused with focusing optical system 71 and then strikes a mirror diaphragm arrangement 73, 75. Mirror diaphragm arrangement 73, 75, the means for spectral spatial division (prism 67), focusing optical system 71, and detectors 77 and 79 are together referred to as multi-band detector 65. One portion of the divided light fan 69 of detected light 33 that comprises only light of a preselected spectral region passes through the mirror diaphragm arrangement and is detected by detector 77, which is configured as a photomultiplier. Another portion of the divided light fan 69 is reflected at mirror diaphragm arrangement 75 and travels to detector 79, which is also configured as a photomultiplier. The mirror diaphragm arrangements are displaceable in the directions illustrated by the double arrows, so that the spectral detection regions of the light conveyed to detectors 77, 79 are continuously adjustable. It is possible (although not depicted for reasons of clarity) also to install further detectors and to arrange further mirror diaphragms. In detectors 77, 79, electrical measured values proportional to the power level of detected light 33 of the respective spectral region proceeding from sample 31 are generated, and in a processing unit 83 these are allocated to the position signals sensed in beam deflection device 23 by means of a position sensor. They are then assembled into an image using a PC. This procedure corresponds to the procedure shown in FIG. 1. Also omitted for better clarity are certain optical elements for guiding and shaping the light beams; these are sufficiently familiar to one skilled in this art. Prism 67 has a particular wavelength-dependent characteristic. Within a spectrum generated by spatial division with prism 67, spectral segments of differing width belong to spatial segments of equal width. Consideration of this wavelength-dependent characteristic, stored in the form of a data set in memory 81 of a processing unit 83, is accomplished by controlling displacement drive systems 85, 87 of slit diaphragms 73, 75. The local width of the slit gap is controlled in such a way that the spectral width of the detected wavelength regions is independent of the spectral position of the wavelength regions.

The invention has been described with reference to a particular exemplary embodiment. It is nevertheless self-evident that changes and modifications can be made without thereby leaving the range of protection of the claims below.

What is claimed is:

1. A scanning microscope for examination of a sample comprising:
   at least one optical component that exhibits a wavelength-dependent characteristic,
   apparatus for wavelength-dependent detection that acquires measured values in at least two wavelength regions each characterized by a spectral width and a spectral position, wherein the wavelength-dependent characteristic of the at least one optical component can be ascertained, can be at least temporarily stored in the form of a data set in a memory, and can be considered upon acquisition and/or upon utilization of the measured values.

2. The scanning microscope as defined in claim 1, wherein the wavelength-dependent characteristic is a property of a spectrally selective element.

3. The scanning microscope as defined in claim 2, wherein the spectrally selective element is a prism, a grating, or a hologram.

4. The scanning microscope as defined in claim 1, wherein the apparatus for wavelength-dependent detection comprises at least one detector, and the wavelength-dependent characteristic is a property of the detector.

5. The scanning microscope as defined in claim 4 further comprising a detector, wherein the wavelength-dependent characteristic is the spectral sensitivity of said detector.

6. The scanning microscope as defined in claim 4, wherein the detector is a photomultiplier and wherein a voltage applied to the photomultiplier is modifiable as a function of the spectral position of the wavelength regions.

7. The scanning microscope as defined in claim 1 further comprising a detection diaphragm having an opening width, wherein the wavelength-dependent characteristic is a property of the detection diaphragm and wherein the opening width of the detection diaphragm is modifiable as a function of the spectral position of the wavelength regions.

8. The scanning microscope as defined in claim 1 further comprising a beam splitter, wherein the wavelength-dependent characteristic is a property of said beam splitter.

9. The scanning microscope as defined in claim 1, wherein the spectral width of the wavelength regions is modifiable as a function of the spectral position of the wavelength regions.

10. The scanning microscope as defined in claim 9, wherein the spectral width of the wavelength regions is independent of the spectral position of the wavelength regions.

11. The scanning microscope as defined in claim 1, wherein the apparatus for wavelength-dependent detection comprises a multi-band detector having a slit diaphragm arrangement, the width of the slits being modifiable as a function of the spectral position of the wavelength regions.

12. The scanning microscope as defined in claim 1 further comprising a processing unit for correcting the measured values.

13. A method for wavelength-dependent detection, with a scanning microscope, of the detected light proceeding from a sample, characterized by the following steps:
- ascertaining at least one wavelength-dependent characteristic of at least one optical component of the scanning microscope;
- storing the ascertained wavelength-dependent characteristic of the component of the scanning microscope in the form of a data set in a memory;
- acquiring measured values and utilizing the measured values, with consideration of the wavelength-dependent characteristic of the optical component of the scanning microscope upon acquisition and/or upon utilization.

14. The method as defined in claim 13, wherein the wavelength-dependent characteristic is a property of a spectrally selective element.

15. The method as defined in claim 13, wherein the apparatus for wavelength-dependent detection comprises at least one detector, and the wavelength-dependent characteristic is a property of the detector.

16. The method as defined in claim 15, wherein the wavelength-dependent characteristic is the spectral sensitivity of the detector.

17. The method as defined in claim 16, wherein the detector is a photomultiplier and wherein a voltage applied to the photomultiplier is modified as a function of the spectral position of the wavelength regions.

18. The method as defined in claim 13, wherein the wavelength-dependent characteristic is a property of a detection diaphragm that has an opening width and wherein the opening width of the detection diaphragm is modified as a function of the spectral position of the wavelength regions.

19. The method as defined in claim 13, wherein the spectral width of the wavelength regions is modified as a function of the spectral position of the wavelength regions.

20. The method as defined in claim 13, wherein the apparatus for wavelength-dependent detection comprises a multi-band detector having a slit diaphragm arrangement, the width of the slit being modified as a function of the spectral position of the wavelength regions.

21. The method as defined in claim 13 further comprising the step of generating of image data from the measured values.

22. The method as defined in claim 13 further comprising the step of correcting of the measured values.

23. The method as defined in claim 13 further comprising the Step of calibrating of the apparatus for wavelength-dependent detection on the basis of the ascertained wavelength-dependent characteristic.

* * * * *